(12) United States Patent
Richter

(10) Patent No.: US 8,096,168 B2
(45) Date of Patent: Jan. 17, 2012

(54) CONTAINER FOR ACCOMMODATING MEDIA, AND METHOD FOR THE PRODUCTION AND VERIFICATION OF THE LEAKPROOFNESS OF SAID CONTAINER

(76) Inventor: Günter Richter, Altenkirchen (DE)

( * ) Notice: Subject to any disclaimer, the term of this patent is extended or adjusted under 35 U.S.C. 154(b) by 829 days.

(21) Appl. No.: 11/547,931

(22) PCT Filed: Apr. 7, 2005

(86) PCT No.: PCT/EP2005/003675
§ 371 (c)(1),
(2), (4) Date: Sep. 22, 2008

(87) PCT Pub. No.: WO2005/098390
PCT Pub. Date: Oct. 20, 2005

(65) Prior Publication Data
US 2009/0018381 A1    Jan. 15, 2009

(30) Foreign Application Priority Data
Apr. 8, 2004  (DE) .......................... 10 2004 017 535

(51) Int. Cl.
*G01M 3/34* (2006.01)
(52) U.S. Cl. ....................................................... 73/49.3
(58) Field of Classification Search .................... 73/49.3
See application file for complete search history.

(56) References Cited

U.S. PATENT DOCUMENTS

| 4,002,055 A | * | 1/1977 | Kops ................................. 73/40 |
| 4,653,312 A | | 3/1987 | Sharp et al. |
| 5,029,464 A | * | 7/1991 | Lehmann ....................... 73/49.3 |
| 5,054,645 A | | 10/1991 | Sharp et al. |
| 5,102,481 A | | 4/1992 | Sharp et al. |
| 5,170,660 A | * | 12/1992 | Lehmann ....................... 73/49.3 |
| 5,239,859 A | * | 8/1993 | Lehmann ....................... 73/49.2 |
| 5,333,491 A | * | 8/1994 | Lehmann ....................... 73/49.3 |
| 6,886,389 B1 | * | 5/2005 | Hagar ............................ 73/40.7 |

FOREIGN PATENT DOCUMENTS
WO   90/14384   11/1990
WO   01/07342   2/2001
* cited by examiner

*Primary Examiner* — Hezron E. Williams
*Assistant Examiner* — Rodney T Frank
(74) *Attorney, Agent, or Firm* — Lucas & Mercanti, LLP; Klaus P. Stoffel

(57) ABSTRACT

The invention relates to a method for verifying the leakproofness of a container used for accommodating preferably liquid media as well as a plastic container that is composed of several segments (22a, 24). The invention further relates to a method for producing a container from several segments and a container comprising a closed barrier layer. The disclosed container is composed of at least two segments (22a, 24) which are joined together circumferentially at the edges of the faces thereof by means of one respective welded connection (16, 17) such that an enclosed space is formed. An inner pressure that is different from the ambient pressure is applied within the enclosed space while a change in pressure is monitored.

13 Claims, 5 Drawing Sheets

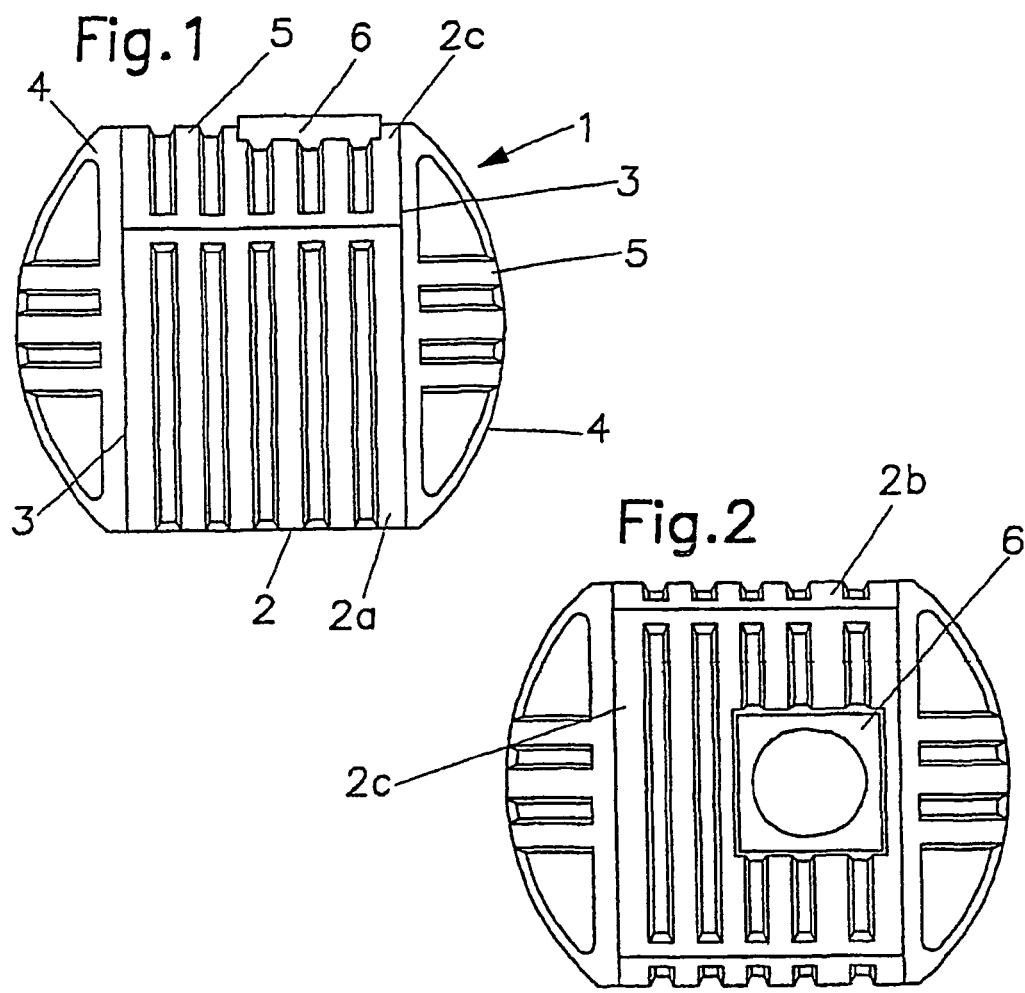
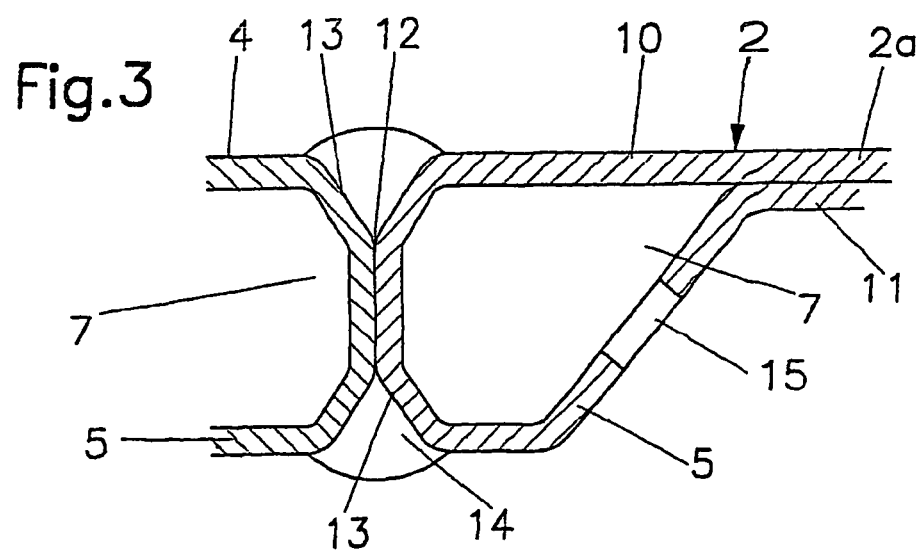

CONTAINER FOR ACCOMMODATING MEDIA, AND METHOD FOR THE PRODUCTION AND VERIFICATION OF THE LEAKPROOFNESS OF SAID CONTAINER

The invention pertains to a double-walled container assembled from at least two segments, which are connected to each other. The invention also pertains to a method for checking the leak-tightness of a container for holding preferably liquid media. This method serves to monitor the container made up of at least two segments, which are welded to each other along at least one butt joint. The invention also pertains to a container with an inside surface which is coated with a barrier layer and to a process for producing a container of this type.

Large-volume containers of plastic which are assembled from several segments are known. The segments are produced preferably by means of a blow-molding process.

A large-volume container for holding liquid media is known from the publication of International Patent Application WO 01/07342 A1. The container comprises two shell-like end parts, each with a flat, ring-shaped connecting surface, and at least one sleeve-like center part, assembled from at least two ring segments, the center part also having two flat, ring-shaped connecting surfaces and an opening for filling and emptying. Both the end parts and the ring segments of the center part are produced by blow-molding. In the area of their connecting surfaces, the parts are connected to each other by an inner and an outer weld. Both the two end parts and the ring segments have a circumferential chamber in the area of their connecting surfaces. At their circumferential boundary edges, the connecting surfaces extend backward to form bevels, which create welding grooves between the end parts and/or the ring segments of the center part.

After a container of this type has been fabricated, the leak-tightness of the container must be checked and, depending on the requirements, certified on the container. Nevertheless, in the case of plastic containers, a leak cannot be . . . simply by applying a positive pressure to the container and monitoring the pressure to see if it drops, because a plastic container, especially one with a large volume, expands when subjected to pressure, as a result of which a pressure drop occurs even though there is no leak. Leaks can also be detected by immersing or submerging the container in a liquid medium, but this is difficult to do and very expensive especially in the case of large containers. Filling the container with a liquid medium such as water, for example, is also very expensive and difficult to integrate into the production process.

A monitoring system for detecting leaks is required for some containers upon which stricter requirements are imposed with respect to leak-tightness. Containers with very strict requirements on leak-tightness are used, for example, for the underground storage of hazardous materials. The monitoring system is used to detect leaks as soon as they occur, so that measures can be initiated to minimize the potential damage. In the case of the known containers, at least in the case of double-walled containers, such monitoring is implemented with the help of a so-called vacuum-monitoring device. Double-walled, blow-molded plastic containers, especially those of large volume, however, cannot be produced at acceptable cost.

Underground hazardous material storage containers such as heating oil storage tanks must be resistant to the permeation of volatile hydrocarbon compounds. Especially when the hazardous material storage tank is located underground, this type of resistance is necessary to prevent the soil surrounding the tank from becoming contaminated with escaping hydrocarbon compounds. It is known that plastic tanks in particular can be provided with a permeation barrier by subjecting the inside wall of the tank to a fluorination process. This fluorination is carried out in fluorination chambers. At least one fluorination chamber large enough to accommodate the tank is required to fluorinate the tank. This process is also associated with considerable cost, especially for large-volume containers with volumes of >0.5 $m^3$. Currently there are no fluorination chambers available for containers with a volume of several cubic meters. Another possibility is to fluorinate the inside walls of individual container segments by a so-called "in-line" technique, where only the inside surface is provided with a barrier layer. This approach does not provide any protection against permeation at the contacting edges or at the welds.

The task of the invention is to provide a container, a process for producing a container, and a method for monitoring the leak-tightness of a container, where the container can be produced easily and at low cost and the leak-tightness of the container can be determined easily.

With respect to the method for checking the leak-tightness of a container for holding preferably liquid media, this task is accomplished according to the features of Claim 1. Additional advantageous embodiments of the invention are indicated in the subclaims.

By providing a test opening in the welded joint, it is possible to apply an internal pressure which is different from that of the environment. The leak-tightness of the welds can then be checked by monitoring the pressure to detect any increase. As a result, the correct execution of the welds and thus the leak-tightness of the container can be easily verified.

A second aspect of the invention pertains to a double-walled container, which serves preferably for the storage of hazardous materials. The container is assembled from at least two segments, which are connected to each other. Each segment comprises an essentially inflexible molded plastic part, which has an inner shell and an outer shell. The inner shell of the molded plastic part comprising the segment is a certain distance away from the outer shell of the molded plastic part, with the result that an interior space is present between the two shells. The first and second molded plastic parts are connected to each other in such a way that at least one closed, gas-tight interior space is present between the inner shell and the outer shell of the container. In addition, a device is provided for generating and monitoring an internal pressure different from the ambient pressure in the minimum of one sealed interior space.

As a result, the leak-tightness of the inner and outer shells of the inventive container can be checked and/or monitored by monitoring the internal pressure. If the internal pressure is monitored continuously, it is also possible to detect leaks which occur only after the container has been put into service, as a result of which measures can be taken immediately to minimize the damage or to prevent any damage from occurring at all. It is also possible as a result to fulfill safety regulations applicable to the storage of hazardous materials.

A third aspect of the invention pertains to a method for monitoring the leak-tightness of a container suitable for the storage of hazardous materials. The container is assembled from at least two segments, where each segment comprises an essentially inflexible molded plastic part with an inner shell and an outer shell. The inner shell of the molded plastic part comprising a segment is a certain distance away from the outer shell of the same molded plastic part. The segments are connected to each other in such a way that at least one gas-tight interior space is created between the inner shell and the outer shell of the container. An internal pressure different from the ambient pressure is applied to the minimum of one interior space. The internal pressure is monitored to detect any change.

As a result, the leak-tightness of the container can be checked and, if the internal pressure is monitored continuously, the leak-tightness of the container can be monitored continuously. Thus leaks which develop afterwards can also be detected relatively easily.

A fourth aspect of the invention pertains to another container which is used preferably to store hazardous materials. The container is assembled from at least two segments, where each segment comprises a molded plastic part which has at least one container wall. A portion of the inside surface of the container is formed by these container walls. The container wall of the first segment and the container wall of the second segment each have a gas-tight barrier layer. The container wall of the first segment and the container wall of the second segment are connected to each other by a weld, where the additional material supplied during the welding operation contains at least a certain amount of a barrier material suitable for creating a gas-tight barrier layer. The weld is executed in such a way that the wall of the container formed by the container walls and the weld has a closed barrier layer.

As a result, this plastic container is suitable for the storage of materials which require a barrier layer on the inside walls of the container to prevent in particular any permeation of substances through the container wall.

A fifth aspect of the invention pertains to a process for producing a container which serves preferably for the storage and transport of hazardous materials. In this process, the container is assembled from at least two segments, where each segment comprises a molded plastic part which has at least one container wall. A portion of the inside surface of the container is formed by these container walls. A gas-tight barrier layer is produced by the container wall of the first segment and by the container wall of the second segment. The container wall of the first and the container wall of the second segment are connected by means of a weld, where, during the welding operation, an additional material is supplied which contains at least a certain amount of a barrier material for forming a gas-tight barrier layer. The weld is executed in such a way that the container walls with the weld have a closed barrier layer after the weld has been completed.

As a result of this process, it is possible to produce a large-volume plastic container at low cost, which is also suitable for the storage and transport of hazardous materials such as heating oil.

A sixth aspect of the invention pertains to a double-walled container, preferably for the storage of hazardous materials. The container has a first shell, which is assembled from at least two segments, where each segment comprises at least one molded plastic part. The container has a second shell, which is located with respect to the first shell in such a way that that a gas-tight space is created between the two shells. In addition, a device is provided for monitoring the gas-tightness of the enclosed space.

A container of this type can be produced at low cost and can be tested for leak-tightness relatively easily.

So that the present invention can be understood more easily, reference is made in the following to the preferred exemplary embodiments illustrated in the drawings, which are described on the basis of specific terminology. It must be pointed out, however, that the protective scope of the invention is not to be considered limited by this description, because any changes or further modifications to the illustrated devices and/or processes and any additional uses of the invention as presented here can be considered to lie within the conventional scope of current or future technical know-how of qualified experts. The figures illustrate exemplary embodiments of the invention, namely:

FIG. 1 shows a side view of a plastic container;

FIG. 2 shows a top view of the container according to FIG. 1;

FIG. 3 shows a cross-sectional view of a weld between two segments of the plastic container of FIGS. 1 and 2 according to a first embodiment of the invention;

Figure 4:
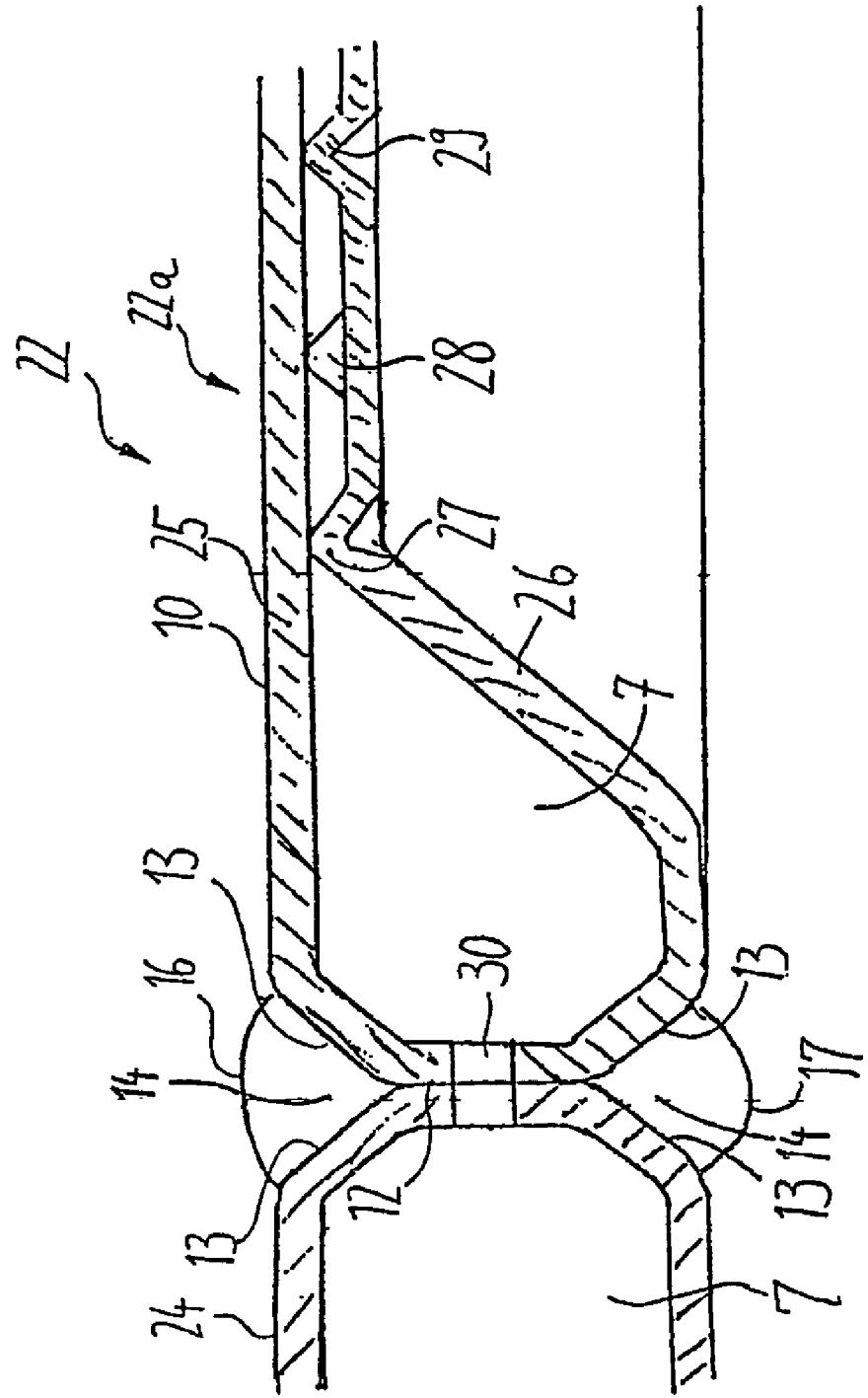
FIG. 4 shows a cross-sectional view of the weld between two segments of the plastic container of FIGS. 1 and 2 according to a second embodiment of the invention.

FIGS. 1 and 2 show views of a large-volume container for the storage of liquid media, especially hazardous materials. A container of this type can also be used, however, to store rainwater or other nonhazardous materials and also to store media in the form of powder. Large-volume containers have a volume of at least 0.5 $m^3$. Large-volume containers with a volume of several $m^3$ up to several tens of $m^3$ are also called "tanks".

The plastic container 1 has a cylindrical, hollow center part 2, which is connected at both end surfaces 3 to an end part 4, as a result of which the end parts 3 and the center part 2 form a closed container 1. The center part 2 is assembled from three ring segments 2a, 2b, 2c, where both the ring segments 2a, 2b, 2c and the two end parts 4 are connected tightly to each other by welds in such a way that a closed, leak-tight container 1 is obtained. The three ring segments 2a, 2b, 2c and the two end parts 4 contain stiffening ribs 5, all of which have essentially the same cross section. The length of the stiffening ribs 5, however, can be different, depending on the position of the stiffening rib 5 on the container 1 and the static requirements on the container 1. A filling and emptying opening 6 is molded into the upper ring segment 2c of the center part. The stiffening ribs 5 are located on the outer wall surfaces, as a result of which the inside surface of the container 1 is essentially smooth. The stiffening ribs 5 prevent the container 1 from being deformed when it is being filled or when subjected to external forces such as those which may act on the container 1 after it has been buried in the ground. The smooth inside container surface makes it easier to empty the container 1 and to clean it.

FIG. 3 shows two abutting stiffening ribs 5, which are formed at the edges of abutting segments 2 and 4 of the container 1. The stiffening ribs 5 contain chambers 7, which are produced as integral parts of their associated segments 2a, 2b, 2c or end part 4 during the production of the ring segments 2a, 2b, 2c and the end parts 4 by the so-called blow-molding process. To produce the ring segments 2a, 2b, 2c and the end parts 4 by the blow-molding process, reference is made to the previously mentioned International Patent Application WO 01/07342 A1, which is herewith included by reference in the present specification.

The ring segment 2a and the end part 4 are connected tightly together by means of an inner weld 16 and an outer weld 17, where at least the weld 16 is executed as a continuous weld, as a result of which a leak-tight connection exists between the ring segment 2a and the end part 4. The end part 4 and the ring segment 2a each have an inside wall 10 and an outside wall 11. Bevels are provided on the abutting edges of the stiffening ribs 5 of the end part 4 and of the ring segment 2a; when the end part 4 and the ring segment 2a are butted up against each other, these bevels form a V-shaped welding groove 14, one on the inside surface 10 and one on the outside surface 11. The bevels are designated "13" in FIG. 3.

The end part 4 and the ring segment 2a each have a connecting surface 12; these surfaces rest against each other when the end part 4 is attached to the ring segment 2a. Two of the previously described bevels 13 adjoin the connecting surfaces 12, one on the inside and one on the outside, thus creating welding grooves 14. The bevels 13 of the welding groove 14 have an angle in the range of 15-45°. The inner wall 10 is preferably thicker than the outer wall 11. In addition, an opening 15 is provided in the outer wall 11 to serve as a feed opening through which the air or gas necessary for the previously mentioned blow-molding operation can be introduced and which can also be used later for the introduction of other substances such as concrete or foam into the chamber 7.

The container 1 is used as an underground hazardous materials storage container. Underground hazmat storage containers must be made in such a way that volatile hydrocarbon compounds cannot permeate through the walls. Plastic containers are subject to the danger of permeation especially when there is a pressure difference between the inside of the container and the surrounding soil. When permeation occurs, that is, when volatile compounds pass through the container wall, they are discharged into the environment of the container 1, as a result of which this environment becomes contaminated. It is known that plastic containers can be provided with a permeation barrier by means of a fluorination process. Because of the size of the container 1 in the present case, however, it is economically unfeasible to fluorinate the entire container, because the fluorination of the container must be performed in a so-called "fluorination chamber", and currently no fluorination chambers with dimensions appropriate for these types of containers are available.

Another possibility of treating the inside surface of the container 1 by means of a fluorination process is to subject the individual container segments 2a, 2b, 2c, 4 to so-called "in-line" fluorination. During in-line fluorination, a barrier layer is produced at least on the inside surface of the inside wall 10 of the container segments 2a, 2b, 2c 4. There will then not be any barrier layer, however, at the connecting points between the segments, that is, especially on the weld 16. According to the invention, an additional material is therefore supplied during the production of the weld 16, this material containing at least a certain amount of a barrier material. The weld 16 is executed in such a way that, after welding, the inside surface 10 of the container 1 has a closed barrier layer. The individual container segments 2a, 2b, 2c, 4 are fluorinated individually in an off-line. Then the barrier layer produced during the fluorination process on the surfaces to be welded, that is, on the bevels 13, is ground off, and the welds 16, 17 between the individual segments 2a, 2b, 2c, 4 are produced by means of a fusion welding process, where the supplied additional material, i.e., the supplied melt material, consists of a mixture which contains a certain amount of a barrier material. A barrier material of this type is sold by Du Pont under the trade name Selar®. The rest of the additional material consists of a conventional material for fusion welding processes, preferably the same plastic as that of which the segments 2a, 2b, 2c, 4 are made.

The formation of a closed barrier layer as described above for the single-layer container 1 can also be used for containers in which the individual segments have multiple layers. For these containers, at least one of these layers, preferably the inside surface of the container, is designed as a barrier layer.

FIG. 4 shows a cross-sectional view similar to that of FIG. 3. In contrast to the container 1 according to FIGS. 1-3, however, the container according to FIG. 4 is a double-walled container. The same elements carry the same reference numbers. Like the container 1 according to FIGS. 1-3, the double-walled container according to FIG. 4 has a center part 22, which is assembled from several ring segments, one of the ring segments in FIG. 4 being designated 22a. The ring segment 22a is adjacent to the connecting surface 12 of an end part 24, where a circumferential chamber 7 is formed both on the ring element 22 and on the end part 24. Chambers 7 are provided at least at the connecting points of the ring segments with each other and at the connecting points of the ring segments with the end parts 24, as a result of which a connecting surface 12 is created and welding grooves 14 are formed by the bevels 13. On the inside surface 10 of the container, a weld 16 is provided in the inner V-shaped welding groove, and on the outside surface 11 of the container, a weld 17 is introduced into the V-shaped groove 14. The weld 16 seals the container off on the inside from the connecting surface 12, and the weld 17 seals the outside surface 11 off from the connecting surface.

In contrast to the arrangement according to FIG. 3, the blow opening 15 shown there is now closed off in a gas-tight manner in the container according to FIG. 4. The ring segment 22a has an inside wall 25 and an outside wall 26, where formations 27, 28, 29 are molded into the outside wall to serve as spacers between the inside wall 25 and outside wall 26. The spacers 27, 28, 29 formed on the outside wall 26 make at least pointwise contact with the outside surface of the inside wall 25, at least after the container has been filled, so that a gas present between the inside wall and outside walls can circulate freely between the spacers 27, 28, 29 or flow around the spacers 27, 28, 29. Between the chamber 7 of the ring element 22a and the chamber 7 of the end part 24, at least one opening is provided in the connecting surface 12, through which the gas can flow from the chamber 7 of the ring segment 22a to the chamber 7 of the end piece 24 and vice versa. Such openings are also provided between the connecting surfaces of the ring segments with each other and additional segments of the container, so that a closed interior space is produced between the inside walls and the outside walls of all the segments.

A vacuum warning device, which is connected to this closed interior space extending through all of the segments 22a, 24, can now be used to generate a negative pressure, that is, a vacuum, in the interior space. The vacuum warning device monitors the pressure in the interior space to detect any increase, and if the pressure increases, it can be inferred that there is a leak, and the device sends a warning message. As a result, the double-walled container can be easily checked for leak-tightness when it is produced, and continuous leak monitoring is also possible during the use of the container, especially when it is used to store hazardous materials. The leak-tightness of the container can thus be monitored easily. Monitoring of this type, which is recommended especially for the storage of hazardous materials, can be easily accomplished with an inventive container according to FIG. 4. If, during this monitoring, a leak in the container is detected, immediate measures can be taken to minimize the damage. As an alternative to the spacers, it is also possible to introduce an open-cell plastic foam or an open-cell foam material which allows gas to circulate between the inside wall 25 and the outside wall 26 in both the chamber 7 and in the area of the spacers. Monitoring by means of a vacuum warning device is also possible with this open-cell foam. As an alternative, the holes 30 between the individual segments can be omitted, but then each segment would have to have its own separate vacuum warning device for monitoring the hollow space of the segment in question.

In other exemplary embodiments, both spacers 27, 28, 29 and an open-pore plastic foam between the spacers 27, 28, 29 are provided in the chamber 7. In alternative exemplary embodiments, neither a plastic foam in the hollow spaces of the segments nor spacers 27, 28, 29 are provided. These containers, however, are less stable than the embodiment shown in FIG. 4 and than a container with open-pore plastic foam in the empty spaces.

Figure 5:
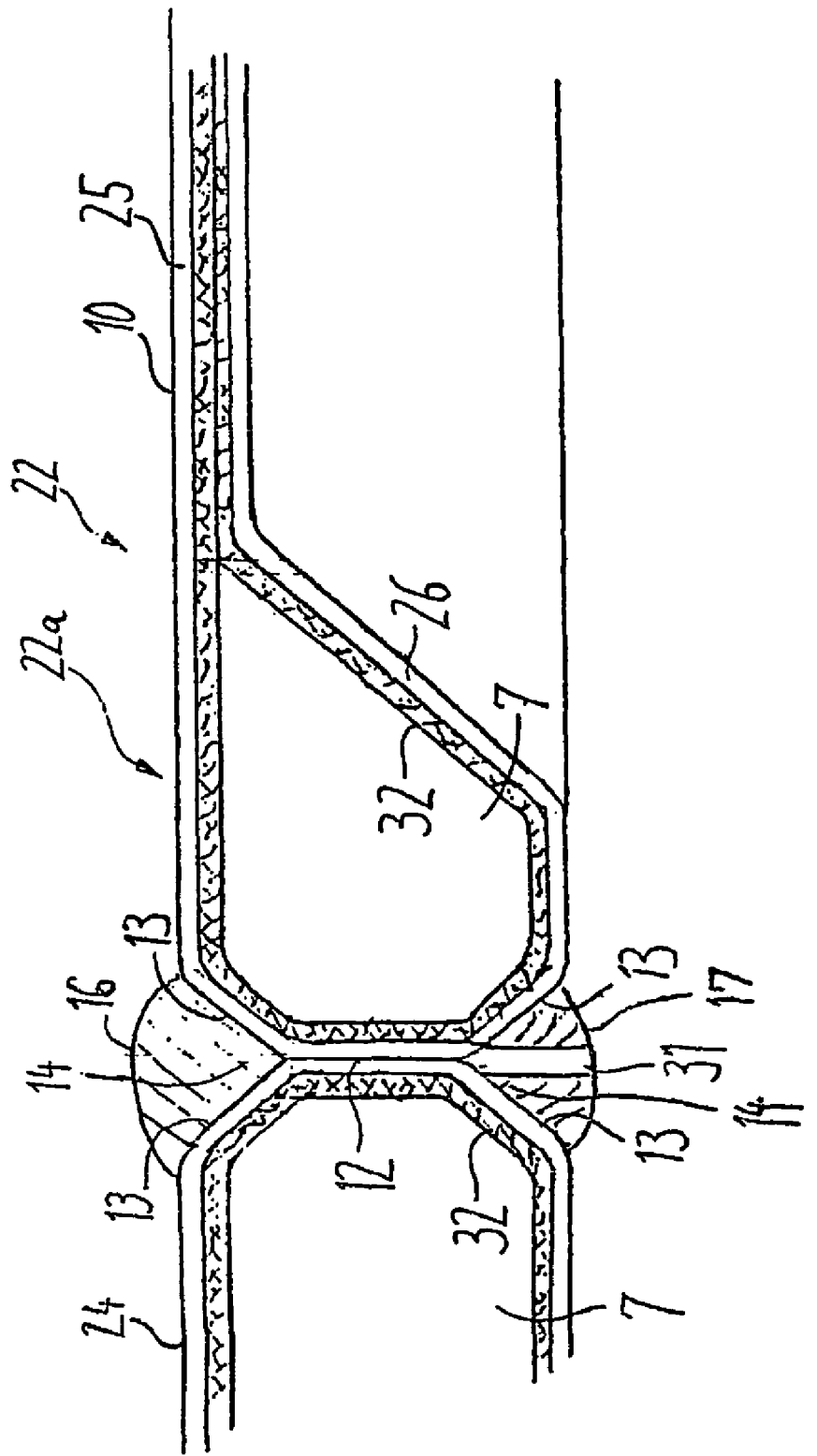
FIG. 5 shows a cross-sectional view of a weld between two segments of the plastic continuous of FIGS. 1 and 2 according to a third embodiment of the invention.

FIG. 5 shows a cross-sectional view of a part of a container which has been made out of double-walled plastic segments. In the case of the container according to FIG. 5, an open-cell plastic foam 32 instead of the spacers 27, 28, 29 has been introduced between the inside wall 27 and the outside wall 26. At least in an area outside the chamber 7, this foam also serves as a spacer between the inside wall 25 and the outside wall 26. In addition, the open-cell plastic foam 32, as already described in conjunction with FIG. 4, allows gas exchange at least within the associated segment 22a, 24. In contrast to the container of FIG. 4, the chambers 7 of the ring segments 22 and the chamber 7 of the end part 24 are not connected to each other by an opening. In the case of the container according to FIG. 5, however, the weld 16 and the weld 17 are each executed to form a seal all the way around the circumference, so that, in the area of the connecting surfaces 12, a gas-tight space is formed, each of these spaces being bounded by the connecting surface of the ring segment 22a, by the connecting surface of the end part 24, and by the welds 16, 17.

A test bore 31 is provided at least at one point in the weld 17. This bore can be used to produce a negative pressure in the gas-tight space, and this negative pressure can be monitored by a vacuum warning device. With this arrangement, both the gas-tightness of the weld 16 and the gas-tightness of the weld 17 can be checked. After the test, the test bore 31 is closed off gas-tight again.

Both the inside wall 25 and the outside wall 26 of the container are made out of a material with the trade name Selar®, as a result of which both the inside wall 25 and the outside wall 26 serve as barrier layers. Thus the permeation of volatile hydrocarbons in particular is effectively prevented. The test bore is preferably provided in the outer weld 17. It would also be possible as an alternative, however, to provide the test bore in the inner weld 16. If the vacuum warning device detects an increase in pressure, a positive pressure can then be applied via the test bore 31 by introducing gas through the test hole 31 into the closed space between the connecting surfaces 12. By wetting both the circumferential weld 17 and the circumferential weld 16 with a leak-detection spray, which makes it very easy to detect any escaping gas, especially escaping air, the leak point or points can be very easily localized.

Alternatively, as FIG. 4 shows, openings are present between the individual hollow spaces of the individual segments of the container, in which case only one test bore in one of the welds 16, 17 or in an inside or outside wall of the container is required to check reliably the leak-tightness of all the welds of the double-walled container in a single test procedure. In this case, the vacuum is then introduced in all areas between the inside wall and the outside wall, and it also extends through the opening 30 into the area of the connecting surfaces 12 as far as the welds 16, 17, so that both the leak-tightness of the welds 16, 17 and the leak-tightness of the inside and outside walls 25, 26 can be checked, i.e., monitored, simultaneously by the use of a single test bore. Alternatively, in other exemplary embodiments, a positive pressure can be applied instead of a negative pressure, and a suitable measuring and evaluating device can be used to detect any drop in pressure.

Figure 6:
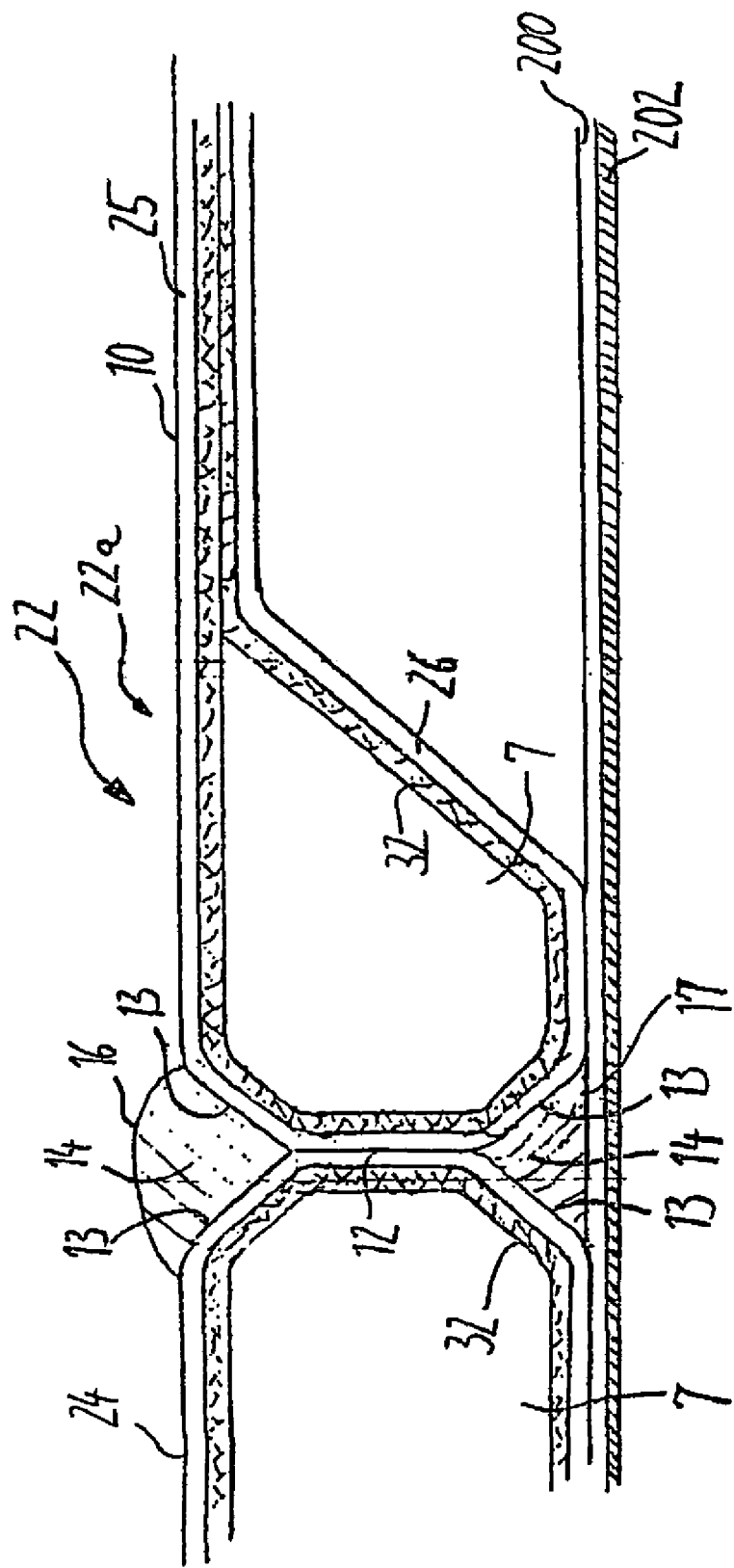
FIG. 6 shows a double-walled container, the outer shell of which is assembled from at least two segments.

FIG. 6 shows a cross sectional view of part of the container wall of a double-walled container used preferably to store hazardous materials. The inner shell has essentially the same structure as that of the container shown in FIG. 5. The container also has an outer shell 202, which is located on the outside wall of the inner shell of the container. A hollow space 200 is thus formed between the outside wall of the inner shell and the inside wall of the outer shell. The inner shell and the outer shell are arranged in such a way that the hollow space 200 is sealed off in a gas-tight manner from the environment. The gas-tightness of the empty space 200 is monitored by a monitoring device, especially by a vacuum warning unit. The welds 17 on the outside wall of the inner shell are executed or finished in such a way that they do not project at all or project only slightly from the outside surface of the inner shell.

Figure 7:
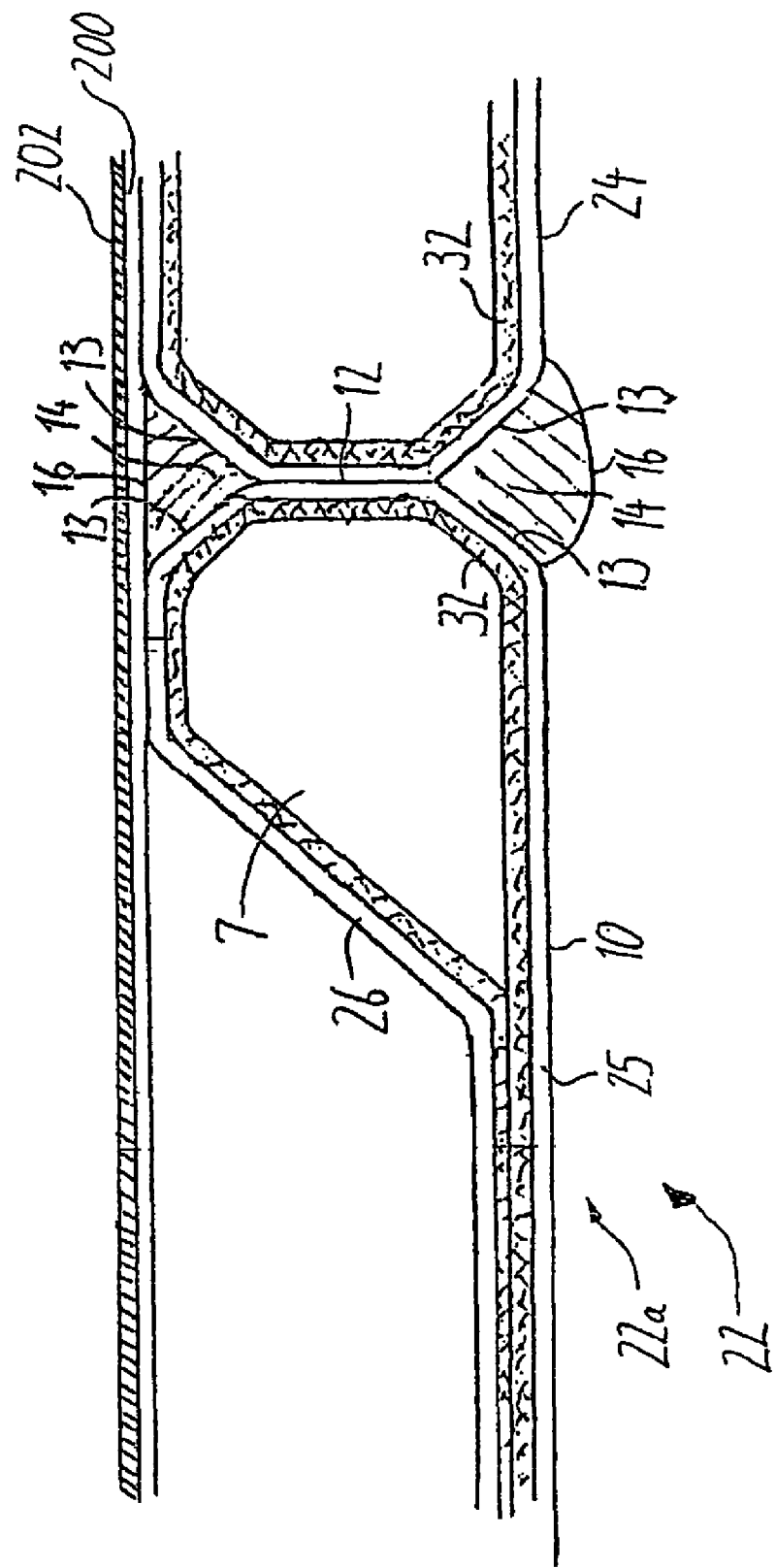
FIG. 7 shows a double-walled container, the inner shell of which is assembled from at least two segments.

In comparison with the container shown in FIG. 6, the double-walled container according to FIG. 7 is designed in such a way that the shell 202 forms the inner shell and the shell assembled from the segments 22a and 24 forms the outer shell of the container. As a result, it is possible to reduce the mechanical requirements on the inner shell 202.

Spacers and/or an open-cell plastic foam can also be provided in the hollow space 200 of the containers according to FIGS. 6 and 7.

Although preferred exemplary embodiments are illustrated and described in detail in the drawings and in the preceding description, they are intended to be taken merely as examples, and the invention is not to be considered limited to them. It is pointed out that only the preferred exemplary embodiments are illustrated and described, and any changes or modifications which lie now and in the future within the protective scope of the invention are also to be protected.

LIST OF REFERENCE NUMBERS 1 container
2, 22 center part
2a, 2b, 2c, 22a ring segments
4, 24 end parts
5 stiffening ribs
6 filling and emptying opening
7 chamber
10, 25 inside wall
11, 26 outside wall
12 connecting surface
13 bevels
14 V-shaped groove
15 blow opening
16, 17 weld
27, 28, 29 spacers
30 opening
31 test bore
32 open-cell plastic foam
100, 200 intermediate space
202 shell

The invention claimed is:

1. Method for checking the leak-tightness of a container for holding media,
in which the container (1) is assembled from at least two segments (2a, 4), which are connected to each other at the edges of their end surfaces by circumferential welds (16, 17) in such a way that a closed space between the end surfaces is formed, which is enclosed by the welds and by at least one area of the end surfaces; wherein an internal pressure different from the ambient pressure is applied to the closed space;

introducing an opening into a weld situated on the container; and the internal pressure is monitored at the opening to detect any change.

2. Method according to claim 1, including forming the closed space as a ring-shaped space that extends around the cross section of the container.

3. Method according to claim 1, wherein the opening is a bore, and the internal pressure is introduced and/or monitored by way of the bore.

4. Method according to claim 1, wherein the applied internal pressure is a negative pressure versus the ambient pressure, and in that the difference between the internal pressure and the ambient pressure is monitored.

5. Method according to claim 4, wherein, when the pressure difference changes and the presence of a leak can thus be inferred, a positive pressure is applied via the opening (31), a gas being introduced to produce a positive pressure; and wherein means which make it possible to detect the leakage point by making visible the escape of gas are applied in the area of the weld.

6. Method according to claim 5, wherein a leak-detection spray is used as the means.

7. Method according to claim 1, including assembling the container (1) from plastic segments.

8. Method according to claim 1, including producing at least one segment (2a, 4) by blow-molding.

9. Method according to claim 1, including providing the container (1) with at least two shell-like end segments (4), each with a flat, ring-shaped connecting surface as the end surface; and providing the container (1) with at least one essentially cylindrical center segment (2), also with flat, ring-shaped connecting surfaces as its end surfaces, where the connecting surfaces of the center segment (2) essentially coincide with the connecting surface of one of the end segments (4).

10. Method according to claim 9, including providing the center segment with a filling and emptying opening (6).

11. Method according to claim 9, including providing at least the center part with stiffening ribs (5) designed as chambers (7), where at least one chamber (7) is adjacent to an end surface which carries the connecting surface.

12. Method according to claim 1, including providing each of the segments (2a, 4) with at least one circumferential chamber (7) in the area of its connecting surfaces, and, along their circumferential boundary edges, the connecting surfaces (12) extending backward to form bevels (13), which create welding grooves (14) between the segments (2a, 4).

13. Method according to claim 12, wherein the bevels (13) have an angle of approximately 10-45°.

* * * * *